United States Patent
Sato et al.

(10) Patent No.: US 6,335,772 B1
(45) Date of Patent: Jan. 1, 2002

(54) APPARATUS AND METHOD FOR A LIQUID CRYSTAL DISPLAY DEVICE HAVING AN ELECTRICALLY-CONDUCTIVE LIGHT-SHADING LAYER FORMED ON A SMOOTHED LAYER

(75) Inventors: Takusei Sato, Tokyo; Fumiaki Abe; Makoto Hashimoto, both of Kanagawa, all of (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/567,050

(22) Filed: May 8, 2000

(30) Foreign Application Priority Data

May 18, 1999 (JP) ............................................. 11-136857

(51) Int. Cl.[7] ........................ G02F 1/136; G02F 1/1333
(52) U.S. Cl. ......................... 349/44; 349/110; 349/138
(58) Field of Search ............................. 349/42, 44, 110, 349/111, 138

(56) References Cited

U.S. PATENT DOCUMENTS

| | | | | |
|---|---|---|---|---|
| 5,499,123 A | * | 3/1996 | Mikoshiba | 359/59 |
| 5,500,750 A | * | 3/1996 | Kanbe et al. | 359/58 |
| 5,847,781 A | * | 12/1998 | Ono et al. | 349/44 |
| 6,002,462 A | * | 12/1999 | Sato et al. | 349/106 |
| 6,005,648 A | * | 12/1999 | Zhang et al. | 349/43 |
| 6,034,747 A | * | 3/2000 | Tanaka et al. | 349/43 |
| 6,057,897 A | * | 5/2000 | Ichikawa et al. | 349/48 |
| 6,075,580 A | * | 6/2000 | Kouchi | 349/110 |
| 6,104,461 A | * | 8/2000 | Zhang et al. | 349/122 |
| 6,115,094 A | * | 9/2000 | Fukunaga | 349/138 |

FOREIGN PATENT DOCUMENTS

JP 10-186402 A * 7/1998

* cited by examiner

Primary Examiner—William L. Sikes
Assistant Examiner—Tarifur R. Chowdhury
(74) Attorney, Agent, or Firm—Ronald P. Kananen; Rader, Fishman & Grauer PLLC

(57) ABSTRACT

To improve the light-shading performance of an electrically-conductive light-shading layer in a liquid crystal display device including polycrystalline SiTFT made on a quartz glass substrate for driving a pixel electrode, and including the electrically-conductive light-shading layer located in a level above the polycrystalline SiTFT and below the pixel electrode, the electrically-conductive light shading layer is stacked on a smoothed inter-layer insulating film which is smoothed by CMP, for example.

14 Claims, 8 Drawing Sheets

APPARATUS AND METHOD FOR A LIQUID CRYSTAL DISPLAY DEVICE HAVING AN ELECTRICALLY-CONDUCTIVE LIGHT-SHADING LAYER FORMED ON A SMOOTHED LAYER

BACKGROUND OF THE INVENTION

1. Field of the Invention

This invention relates to a liquid crystal display device and its manufacturing method especially suitable for application to a liquid crystal display having an electrically-conductive light-shading layer provided in a level above a thin film transistor for driving pixel electrodes and below the pixel electrodes.

2. Description of the Related Art

Liquid crystal display devices are widely used as flat-type displays. As a thin film transistor (TFT) for driving pixel electrodes in such a liquid crystal display, amorphous silicon (a-Si) TFT was used conventionally. Recently, however, polycrystalline SiTFT has come to be used often.

Photosensitivity of polycrystalline SiTFT is not so high as that of a-SiTFT. Recently, however, liquid crystal display devices such as projector have increasingly been used under intensive light, and light leak current is no more negligible even with polycrystalline SiTFT. As a result, degradation of contrast and deterioration of the image quality such as cross-talk and flicker, for example, have arisen as problems.

In liquid crystal display devices, light from light source is usually introduced from the side of the opposed substrate. As to prevention of light from entering into polycrystalline SiTFT, as disclosed in Japanese Patent Laid-Open Publication No. hei 5-100250 and Japanese Patent Application No. hei 10-307465, for example, by locating the electrically-conductive light-shading layer (black matrix) conventionally provided on the opposed substrate to the level above the polycrystalline SiTFT of a TFT substrate, which is nearer to the polycrystalline SiTFT, reduction of such light has been attained.

However, according to the knowledge of the inventor, in the techniques disclosed in the documents, Japanese Patent Laid-Open Publication No. hei 5-100250 and Japanese Patent Application No. hei 10-307465, due to the phenomenon that the thickness of the electrically-conductive light-shading layer becomes thinner in level-difference portions caused by unevenness of the underlying insulating layer, in other words, the phenomenon that the step coverage degrades, the shading performance is insufficient at the level-difference portions. Therefore, under high-luminance irradiation of light, leak light from level-difference portions causes generation of a light leak current, and deterioration of the image quality cannot be prevent under the current technologies.

This problem is discussed below in greater detail. FIG. 1 shows a TFT substrate of a conventional active matrix type liquid crystal display device. As shown in FIG. 1, a shading layer 102 is provided on a shading region of a quartz glass substrate 101, and an inter-layer insulating film 103 is provided to cover the shading layer 102. Formed on the inter-layer insulating film 103 is a polycrystalline Si film 104 of a predetermined pattern, and a gate insulating film 105 is provided to cover the polycrystalline Si film 104. A gate wiring 106 is formed on the gate insulating film 105. Although not shown, the polycrystalline Si film 104 has formed therein a source region and a drain region (not shown) in self alignment with the gate wiring 106. The gate electrode made of the gate wiring 106 and those source region and drain region make up a polycrystalline SiTFT for driving pixel electrodes. On a predetermined portion of the gate insulating film 105 above the drain region, an electrode 107 is provided. This structure interposing the gate insulating film 105 between this electrode 107 and the drain region constitutes a holding capacitor element.

An inter-layer insulating film 108 is provided to cover the gate wiring 106 and the electrode 107. Contact holes 109 and 110 are formed at predetermined portions of the inter-layer insulating film 108 and the gate insulating film 105. In the shading region, a lead-out electrode 111 is provided in connection with the drain region of the polycrystalline SiTFT through the contact hole 109, and a signal wiring 112 is provided in connection with the source region of the polycrystalline SITFT through the contact hole 110. An inter-layer insulating film 113 is formed to cover these lead-out electrode 111 and the signal wiring 112. In a predetermined location on the inter-layer insulating film 113, a SiN film 114 made by plasma CVD lies. The SiN film 114 mainly inactivates dangling bonds in the polycrystalline Si film 104 with hydrogen, and functions as a hydrogen supply source for improving the property of the polycrystalline SiTFT. Further provided is a contact hole 115 in a predetermined portion of the inter-layer insulating film 113 above the lead-out electrode 111. In contact with the lead-out electrode 111 through the contact hole 114, an electrically-conductive light-shading layer 116 is provided on the inter-layer insulating film 113, and an electrically-conductive light-shading layer 117 is provided on the SiN film 114. The structure stacking these electrically-conductive light-shading layer 116, 117, lead-out electrode 111 and signal wiring 112 shields the incident light from above over the entire region other than the pixel aperture region. An inter-layer insulating film 118 is provided to cover the electrically-conductive light-shading layers 116, 117. The inter-layer insulating film 118 has formed a contact hole 119 in a predetermined location above the electrically-conductive light-shading layer 116. On the inter-layer insulating film 118, a transparent pixel electrode 120 is provided in connection with the electrically-conductive light shading layer 116 through the contact hole 119. An orientation film 121 of a liquid crystal (not shown) is provided to cover the pixel electrode 120.

In the conventional liquid crystal display apparatus explained above with reference to FIG. 1, since the electrically-conductive light-shading layers 116, 117 are formed on the inter-layer insulating film 113 which includes a large unevenness reflecting the stepped configuration of the base layer, step coverage of these electrically-conductive light-shading layers 116, 117 degrades. Therefore, the light shading performance of these electrically-conductive light-shading layers 116, 117 was not sufficient in these step portions, which invited generation of a light leak current by leak light from level-difference portions under high-luminance irradiation of light, and deterioration of the image quality could not be prevented.

OBJECTS AND SUMMARY OF THE INVENTION

It is therefore an object of the invention to provide a liquid crystal display device and its manufacturing method which can improve the light shading performance of an electrically-conductive light shading layer and can prevent deterioration of the image quality caused by a light leak current.

According to the invention, there is provided a liquid crystal display device having a thin-film transistor for driving a pixel electrode on a substrate and an electrically-conductive light-shading layer lying in a level above the thin film transistor and below the pixel electrode, comprising:

the electrically-conductive light-shading layer being formed on a smoothed layer.

There is further provided a liquid crystal display device having a first light-shading layer formed on a substrate, a thin film transistor for driving a pixel electrode formed on the first light shading layer, and a second light-shading layer formed in a level above the thin-film transistor and below the pixel electrode, comprising:

the second light-shading layer being formed on a smoothed layer.

There is further provided a method for manufacturing a liquid crystal display device having a thin-film transistor for driving a pixel electrode on a substrate and an electrically-conductive light-shading layer lying in a level above the thin film transistor and below the pixel electrode, characterized in:

the electrically-conductive light-shading layer being formed on a smoothed layer.

There is further provided a method for manufacturing a liquid crystal display device having a first light-shading layer formed on a substrate, a thin film transistor for driving a pixel electrode formed on the first light shading layer, and a second light-shading layer formed in a level above the thin-film transistor and below the pixel electrode, characterized in:

the second light-shading layer being formed on a smoothed layer.

In the present invention, the surface of the smoothed layer is smoothed to a residual level difference (difference between the highest level and the lowest level) not larger than 0.5 $\mu$m and more preferably not larger than 0.3 $\mu$m, excluding the contact portions in the display region. The smoothed layer is typically an insulating layer made of $SiO_2$ as its major component, but it may be an insulating layer of any other appropriate material.

To make the smoothed layer, various methods are usable, which can ensure a residual level difference not larger than 0.5 $\mu$m, for example. Examples are a method for making a film ensuring a good burying property, such as plasma CVD or normal-pressure CVD, using tetraethoxysilane (TEOS) as the source material gas, a method first making a film of phosphosilicate glass (PSG), borophosphosilicate glass (BPSG), or the like and then making it reflow, a flow method utilizing spin-on-glass (SOG), a method first making an insulating film and thereafter conducting its etch-back, a method first making an insulating film and then polishing it by chemical-mechanical polishing (CMP), and so on. Among these methods, CMP is preferable because of its advantages that excellent evenness is ensured and plasma damage to thin film transistors can be prevented. Usable as the insulating layer to be smoothed by CMP are, especially, a film by plasma CVD using TEOS, film by atmospheric-pressure CVD using TEOS, film by high-density plasma CVD, multi-layered film of these layers, and so on.

From the viewpoint of restricting the coupling capacitance with the adjacent wiring, the electrically-conductive light-shading layer preferably has a sheet resistance not higher than 100 $\Omega/\square$ and more preferably not higher than 10 $\Omega/\square$. Furthermore, from the viewpoint of suppressing the light leak current of the thin film transistor, the electrically-conductive light-shading layer preferably exhibits a transmittance not higher than 10% for light of a wavelength from 400 to 500 nm, and more preferably not higher than 5%, and yet lower for increasing the light shading effect. Basically, thickness of the electrically-conductive light shading layer may be selected freely as long as it ensures both requirements for lower sheet resistance and light shading property. Actually, however, since a transparent pixel electrode is further formed on the electrically-conductive light shading layer via an insulating layer to sandwich a liquid crystal, the thickness of the electrically-conductive light shading layer is preferably selected within a range ensuring that any unevenness caused by the electrically-conductive light shading layer does not adversely affects the orientation of the liquid crystal. Practically, thickness of the electrically-conductive light-shading layer is preferably within the range from 50 to 500 nm, and more preferably from 100 to 300 nm. Basically, any material is freely selected as the material of the electrically-conductive light-shading layer as far as both it satisfies both an electrical conductivity and a light shading property. Appropriate examples are, for example, Al, Cu, W, Mo, Pt, Pd, Ti, TiN, Cr, their alloys or silicides, and so on.

The electrically-conductive light-shading layer is provided in the pixel portion, for example, as two separate portions, one being connected to the pixel electrode and the other connected to the common potential. Against incident light coming from above, the electrically-conductive light-shading layer makes multiple layers with at least one other light-shading Layer to shade the light over the entire area other than the regions of pixel openings.

In the present invention, the thin film transistor for driving the pixel electrode is typically a thin film transistor made of polycrystalline silicon, namely, polycrystalline SiTFT. This polycrystalline SiTFT may be either high-temperature polycrystalline SiTFT using a polycrystalline Si film made by a high-temperature process or low-temperature polycrystalline SiTFT using a polycrystalline Si film made by a low-temperature process. Alternatively, the thin film transistor for driving the pixel electrode may be a-SiTFT.

According to the invention having the above-summarized structure, since the electrically-conductive light-shading layer or the second light shading layer is formed on a smoothed layer, step coverage of the electrically-conductive light-shading layer or the second light shading layer is improved, and the evenness of its thickness is improved. Therefore, the electrically-conductive light-shading layer or the second light shading layer performs a sufficient light shading function, leak light can be reduced remarkably. As a result, even under high-luminance irradiation of light, generation of a light leak current can be prevented.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
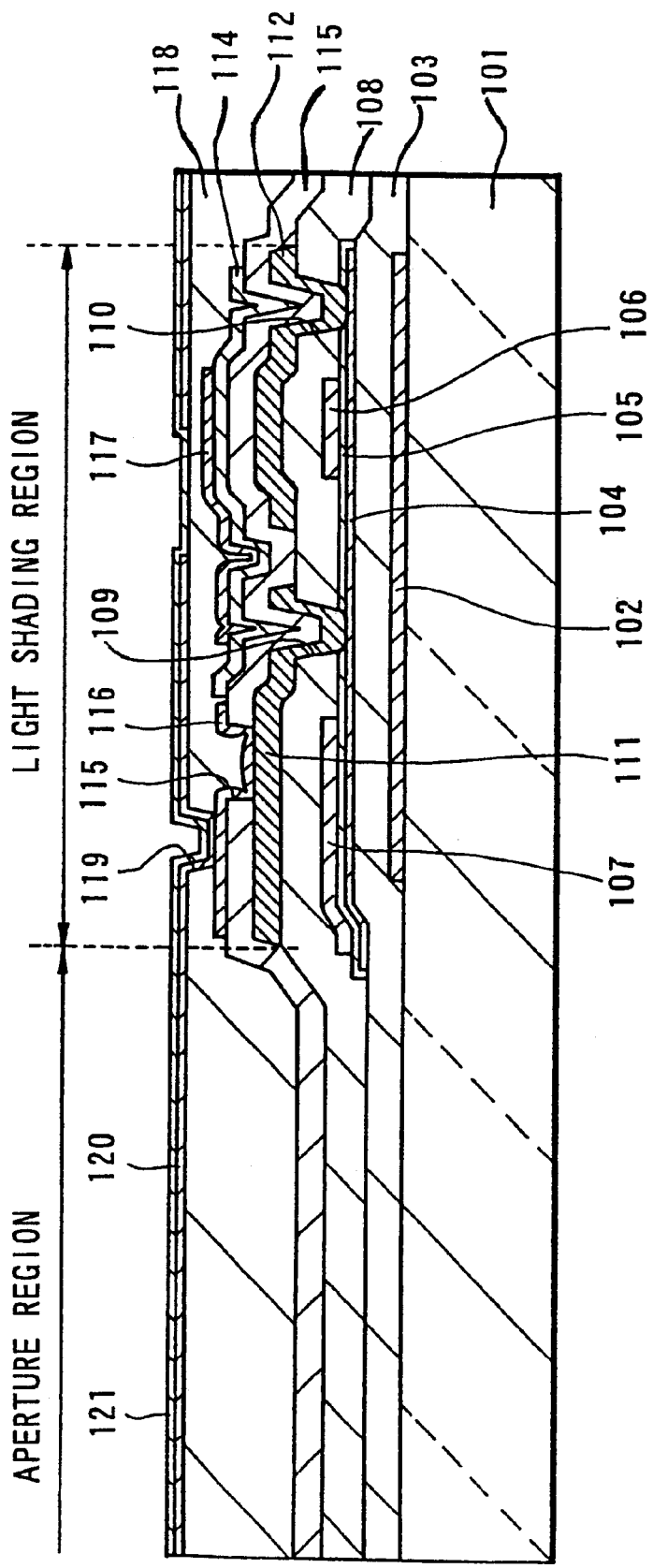
FIG. 1 is a cross-sectional view of a TFT substrate of a conventional liquid crystal display device.

An embodiment of the invention is explained below with reference to the drawings. In all figures illustrating the embodiment, the same and equivalent portions are labeled with common reference numerals.

Figure 2:
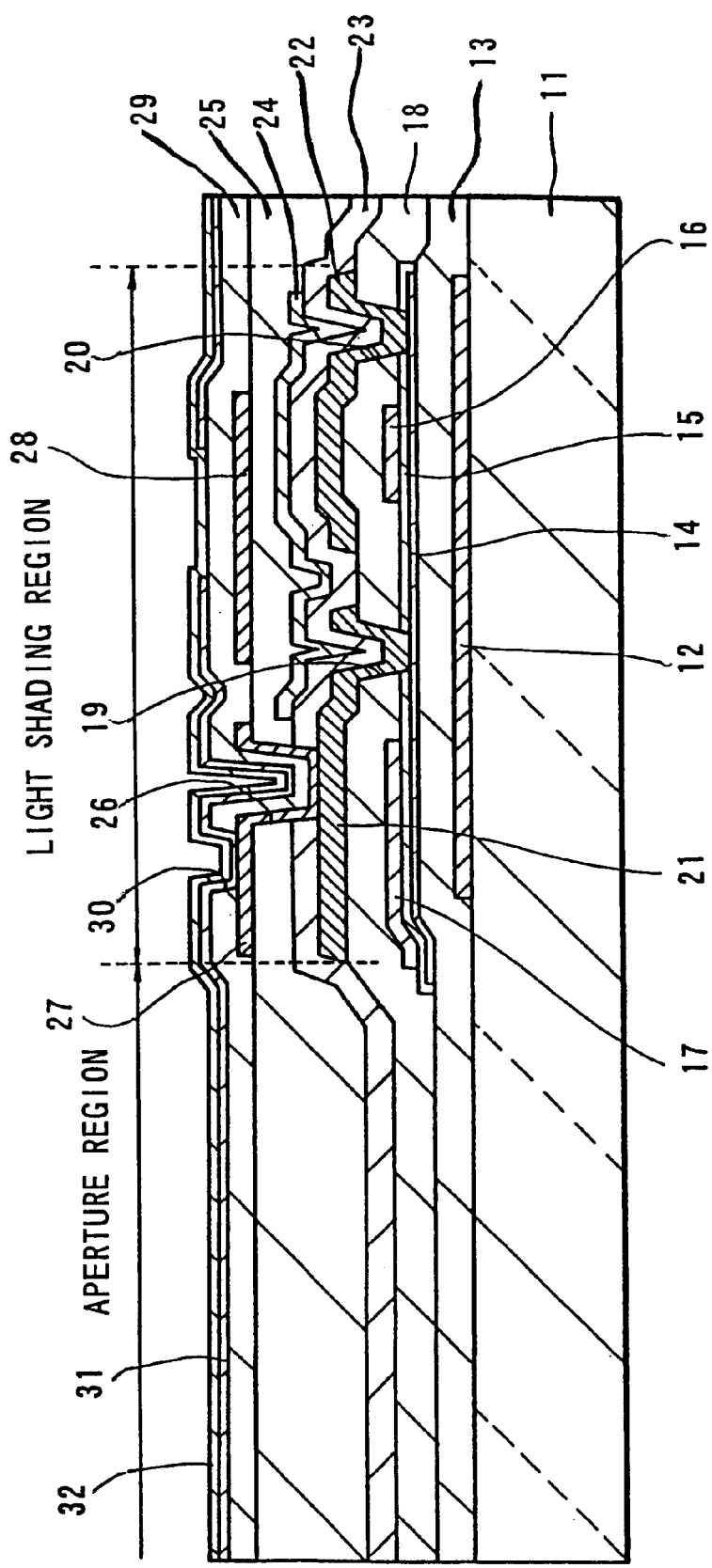
FIG. 2 is a cross-sectional view of a TFT substrate of a liquid crystal display device according to the first embodiment of the invention.
Figure 3:
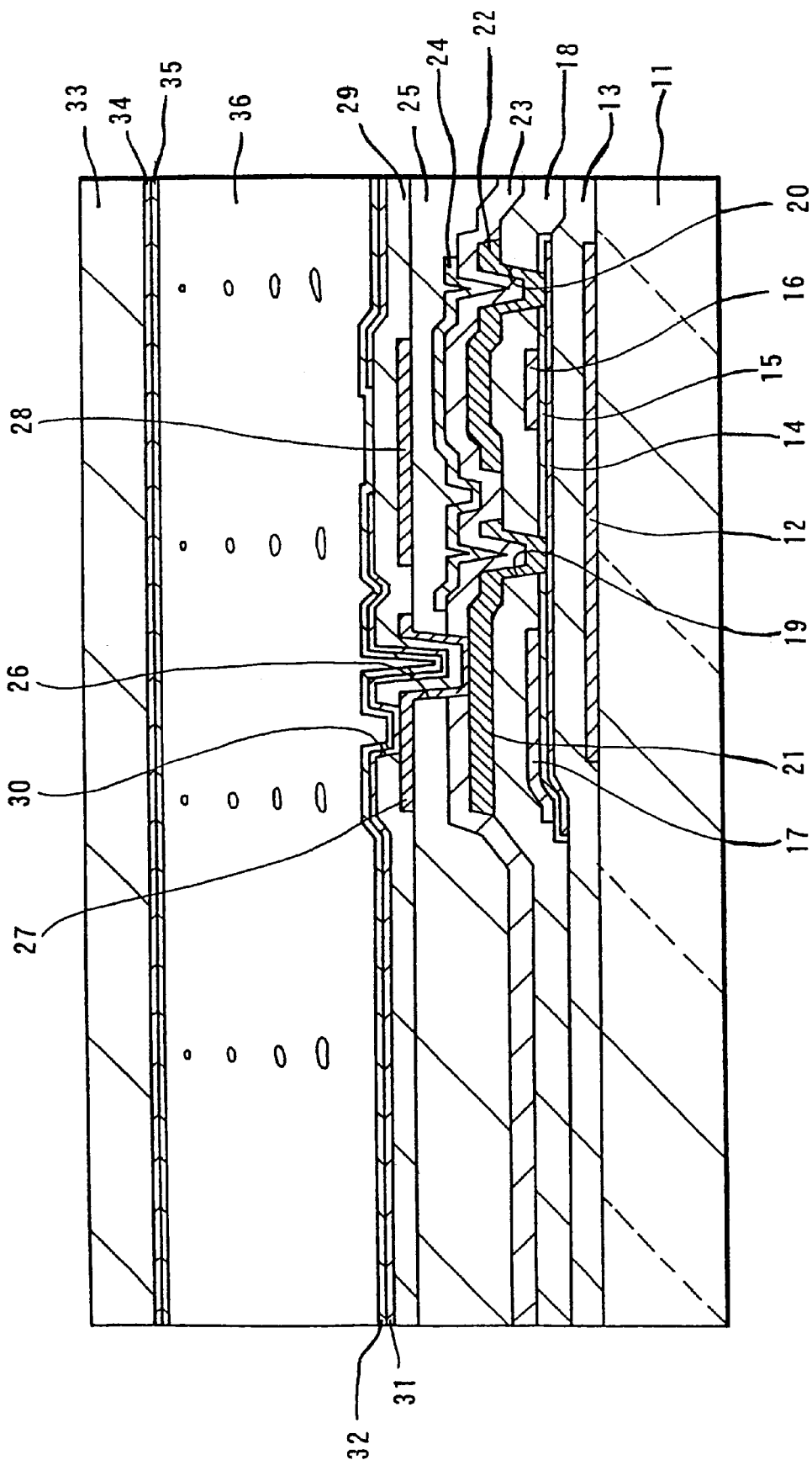
FIG. 3 is a cross-sectional view showing the entire structure of the liquid crystal display device according to the first embodiment of the invention.

FIG. 2 shows a TFT substrate of a liquid crystal display device according to the first embodiment of the invention, and FIG. 3 shows the entire structure of the liquid crystal display device according to the first embodiment of the invention. This liquid crystal display device is an active matrix type liquid crystal display device.

As shown in FIGS. 2 and 3, the liquid crystal display device includes a light shading layer 12 provided on a quartz glass substrate 11 in a light shading region. The light shading layer 12 is a multi-layered film made by sequentially stacking a polycrystalline Si film which is 50 nm thick, for example, and doped with phosphorus (P), and a WSi film which is 200 nm thick, for example. So as to cover this light shading layer 12, an inter-layer insulating film 13 made of $SiO_2$ film, for example, is provided. Formed on the inter-layer insulating film 13 is a polycrystalline Si film 14 of a predetermined pattern, and so as to cover the polycrystalline Si film 14, a gate insulating film 15 made of $SiO_2$ film, for example, is provided. Formed on the gate insulating film 15 is a gate wiring 16. Although not shown, the polycrystalline Si film 14 has formed therein a source region and a drain region in self alignment with the gate wiring 16. A gate electrode made of the gate wiring 16 and those source region and drain region make up a polycrystalline SiTFT for driving the pixel electrode. An electrode 17 is provided on a location of the gate insulating film 15 above the drain region. This structure sandwiching the gate insulating film 15 between the electrode 17 and the drain region make up a holding capacitor element.

The gate wiring 16 and the electrode 17 are a multi-layered film made by sequentially stacking a polycrystalline Si film which is 100 nm thick, for example, and doped with P, and a WSi film which is 100 nm thick, for example. An inter-layer insulating film 18 is provided to cover the gate wiring 16 and the electrode 17. Contact holes 19, 20 are formed in predetermined locations of the inter-layer insulating film 18 and the gate insulating film 15. On the inter-layer insulating film 18 in the light shading region, a lead-out electrode 21 is formed in connection with the drain region of the polycrystalline SiTFT through the contact hole 19, and a signal wiring 22 is provided in connection with the source region of the polycrystalline SiTFT through the contact hole 20. These lead-out electrode 21 and signal wiring 22 are a multi-layered film made by sequentially stacking a WSi film which is 50 nm thick, for example, an Al film which is 300 nm thick, for example, and a WSi film which is 50 nm thick, for example. So as to cover these lead-out electrode 21 and signal wiring 22, an inter-layer insulating film 23 made of $SiO_2$, for example, is provided. The inter-layer insulating film 23 is a 400 nm thick PSG film made by atmospheric-pressure CVD, for example. Formed on a predetermined portion of the inter-layer insulating film 23 is a SiN film 24 which is 200 nm thick, for example, and made by plasma CVD. The SiN film 24 mainly inactivates dangling bonds in the polycrystalline Si film 14 with hydrogen, and functions as a hydrogen supply source for improving the property of the polycrystalline SiTFT. On these inter-layer insulating film 23 and SiN film 24, an inter-layer insulating film 25 is provided. This inter-layer insulating film 25 is a $SiO_2$ film made by plasma CVD using TEOS, for example, as the source material gas. On a predetermined portion of the inter-layer insulating film 25 and inter-layer insulating film 23 above the lead-out electrode 21, a contact hole 26 is formed.

The surface of the inter-layer insulating film 25 is smoothed to a residual level difference not larger than 0.5 $\mu$m and more preferably not larger than 0.3 $\mu$m, excluding the portion of the contact hole 26.

Thickness of this inter-layer insulating film 25 is about 1.8±0.5 $\mu$m in the aperture region and about 0.3 $\mu$m in the portion above the lead-out electrode 21.

On the inter-layer insulating film 25 having the smoothed surface, electrically-conductive light-shading layers 27, 28 are provided separately. The electrically-conductive light-shading layer 27 is connected to the lead-out electrode 21 through the contact hole 26. These electrically-conductive light-shading layers 27, 28 are a Ti film which is 250 nm thick, for example. The structure stacking these electrically-conductive light-shading layers 27, 28, lead-out electrode 21 and signal wiring 22 shades the incident light entering from above all over the area excluding the pixel opening region. The electrically-conductive light-shading layer 27 is connected to the pixel electrode, which is explained later, and the electrically-conductive light-shading layer 28 is connected to a predetermined common potential.

An inter-layer insulating film 29 is provided to cover the electrically-conductive light-shading layers 27, 28. This inter-layer insulating film 29 is a 400 nm thick $SiO_2$ film made by plasma CVD using TEOS, for example, as the source material gas. On a predetermined portion of the inter-layer insulating film 29 above the electrically-conductive light-shading layer 27, a contact hole 30 is formed. On the inter-insulating film 29, a transparent pixel electrode 31 is provided in connection with the electrically-conductive light-shading layer 27 through the contact hole 30.

The pixel electrode 31 is 70 nm thick, for example, and made of ITO. A liquid crystal orientation film 32 is provided to cover the pixel electrode 31.

As shown in FIG. 3, a liquid crystal 36 is confined between the TFT substrate having the above-explained structure and a multi-layered structure made by sequentially stacking a transparent electrode 34 as the opposed electrode and a liquid crystal orientation film 35 on a major surface of a glass substrate 33.

Next explained is a manufacturing method of the liquid crystal display device having the above-explained structure according to the first embodiment.

Figure 4:
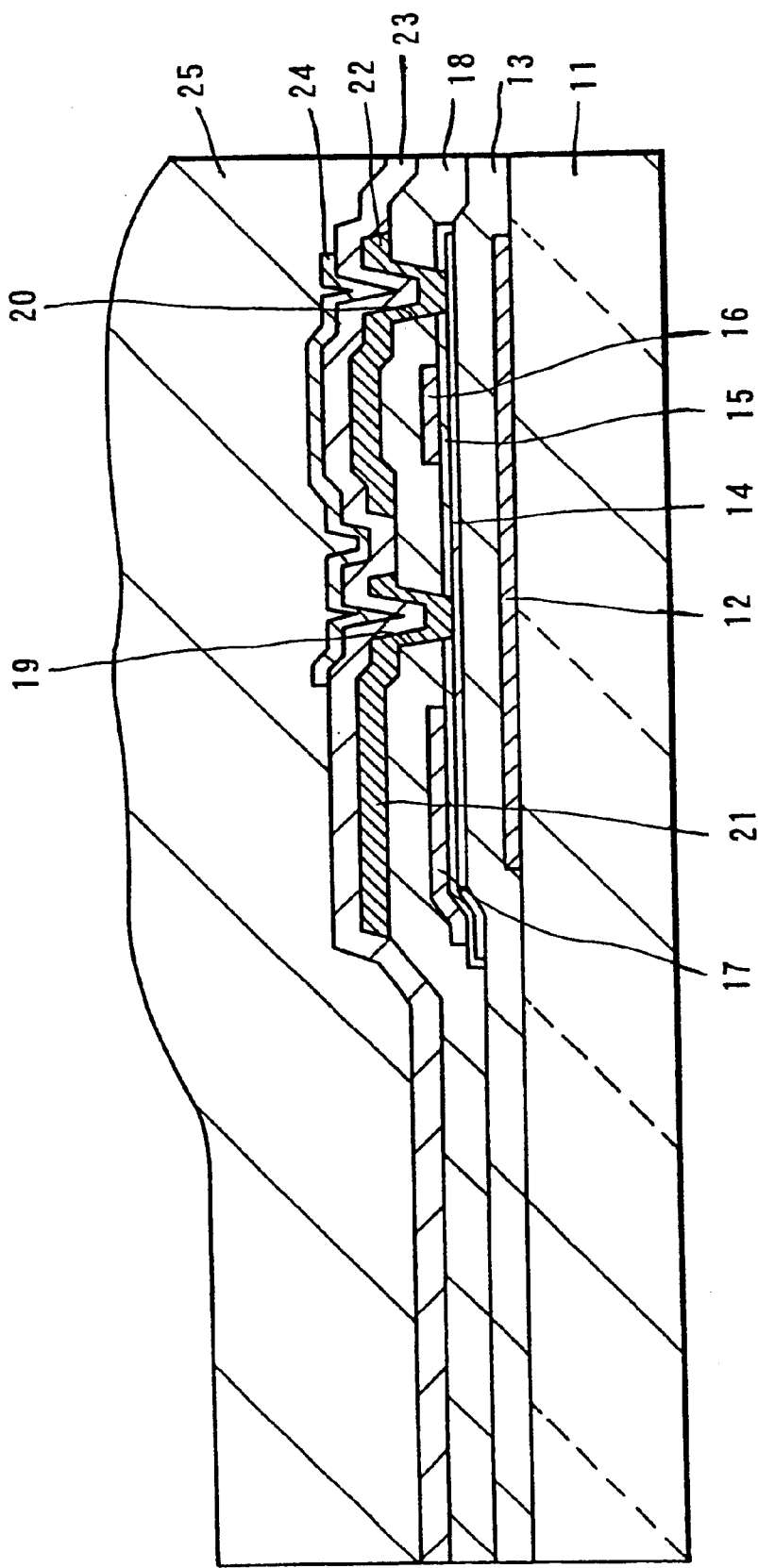
FIG. 4 is a cross-sectional view for explaining a manufacturing method of the liquid crystal display device according to the first embodiment of the invention.

First referring to FIG. 4, after a P-doped polycrystalline Si film and WSi film are sequentially formed on the quartz glass substrate 11, these films are patterned to form the light shading layer 12. Next formed on the entire substrate surface is the inter-layer insulating film 13 made of $SiO_2$ film by CVD, for example. After that, the polycrystalline Si film 14 is formed on the entire surface by CVD, for example, it is patterned. Next, after the gate insulating film 15 made of $SiO_2$ film is formed on the entire substrate surface by CVD, for example, it is patterned into a predetermined configuration. Then, after a P-doped polycrystalline Si film and WSi film are sequentially stacked on the entire substrate surface, these films are patterned to make the gate wiring 16 and the capacitor element electrode 17.

In the next step, the inter-layer insulating film 18 made of $SiO_2$ is stacked on the entire substrate surface by CVD, for example. Thereafter, the inter-layer insulating film 18 and the gate insulating film 15 are selective removed by etching to make the contact holes 19, 20. Then, after a WSi film, Al film and WSi film are sequentially formed on the entire substrate surface, these films are patterned to make out the lead-out electrode 21 and the signal wiring 22. After that, the inter-layer insulating film 23 made of $SiO_2$ is stacked on the entire substrate surface by atmospheric-pressure CVD, for example. Then, after the SiN film 24 is formed on the entire substrate surface by plasma CVD, for example, it is patterned.

After that, the inter-layer insulating film 25 made of $SiO_2$ for the smoothing purpose if stacked on the entire substrate surface by plasma CVD using TEOS, for example, as the source material gas. This inter-layer insulating film 25 is 2500 nm thick, for example.

Figure 5:
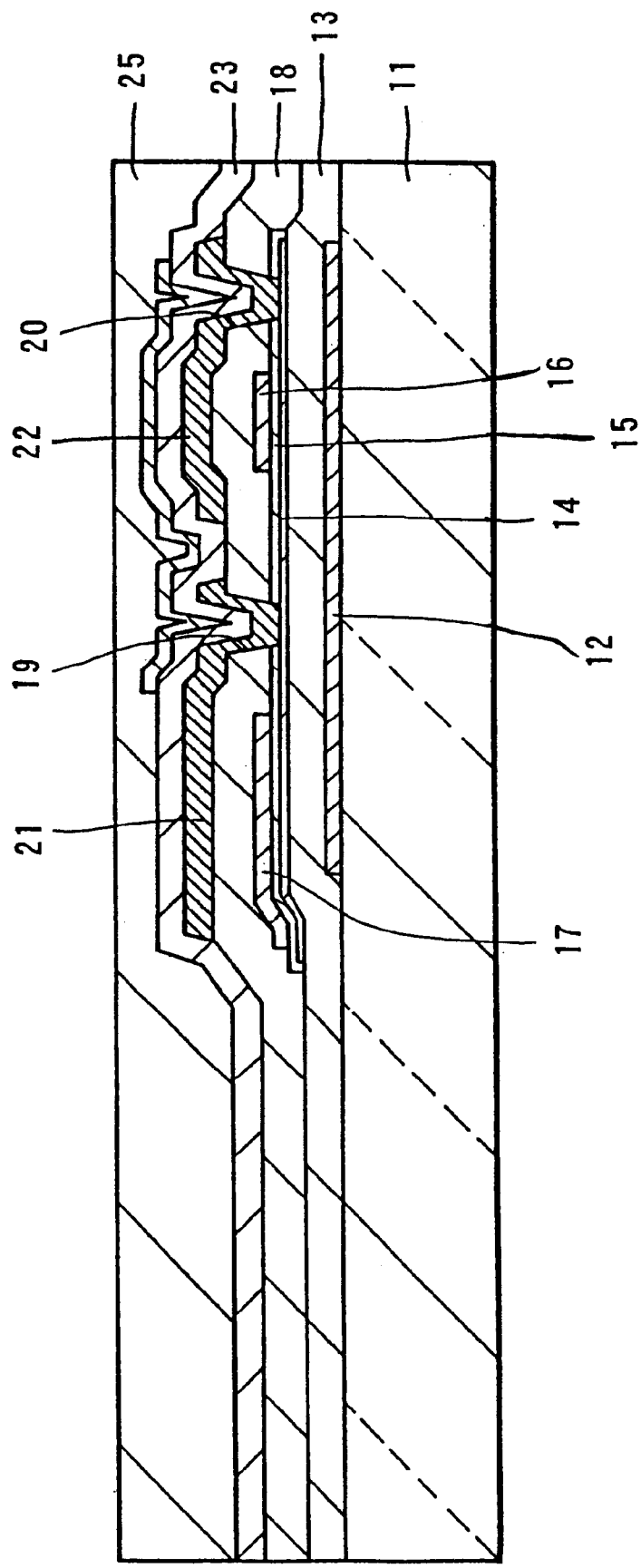
FIG. 5 is a cross-sectional view for explaining a manufacturing method of the liquid crystal display device according to the first embodiment of the invention.

Thereafter, as shown in FIG. 5, the inter-layer insulating film 25 is smoothed by cutting away a part of its thickness, around 2200 nm for example, by CMP. The residual level difference after smoothing by CMP can be not larger than 0.5 $\mu$m in maximum, or can be not larger than 0.1 $\mu$m under well-controlled conditions. An example of CMP conditions is shown below.

| | |
|---|---|
| Polishing Load | 470 gf/cm² |
| Chuck Revolutions | 60 rpm |
| Table Revolutions | 4 rpm |
| Height of Retainer | 840 $\mu$m |
| Polishing Rate | Polished for four minutes at 500 nm/minute |
| Dress | In-situ dress |
| Slurry | One part of SS-25 (slurry prepared by suspending silica particles into KOH liquid) diluted with two parts of pure water is used |

In the next step, as shown in FIG. 2, the inter-layer insulating films 25 and 23 are selectively removed by etching to make the contact hole 26. Then, after a Ti film is formed on the entire substrate surface by vacuum evaporation or sputtering, for example, the Ti film is patterned to make the electrically-conductive light-shading layers 27, 28. In this process, at the time when the Ti film is formed, the surface of the underlying inter-layer insulating film 25 is already smoothed. Therefore, step coverage of this Ti film, and hence of the electrically-conductive light-shading layers 27, 28, is good, and a uniform thickness is obtained.

After that, the inter-layer insulating film 29 made of $SiO_2$ is formed on the entire substrate surface by plasma CVD using TEOS, for example. Thereafter, the inter-layer insulating film 29 is selectively removed by etching to make the contact hole 30. Next, after an ITO film is formed on the entire substrate surface, it is patterned by etching to make the pixel electrode 31. Thereafter, the orientation film 32 is formed on the entire substrate surface.

After the TFT substrate is fabricated through those steps, the process is progressed according to a known manner to complete the intended liquid crystal display device as shown in FIG. 3.

As explained above, according to the first embodiment, since the electrically-conductive light-shading layers 27, 28 are stacked on the inter-layer insulating film 25 whose surface is already smoothed by CMP, step coverage of these electrically-conductive light-shading layers 27, 28 is improved as compared with conventional one, and a uniform thickness is obtained. Therefore, these electrically-conductive light-shading layers 27, 28 perform excellent light shading function, prevent leak light and remarkably reduce the light leak current. Therefore, even when the display device is used under a large quantity of light, spot incidence and cross-talk caused by light leak current can be reduced significantly, and degradation of the image quality can be prevented.

Next explained is an example of the second embodiment of the invention.

In the first embodiment already explained, the inter-layer insulating film 25 used as the base layer of the electrically-conductive light-shading layers 27, 28 is prepared by first stacking a thick $SiO_2$ film by plasma CVD using TEOS as the source material gas, and thereafter polishing it by CMP. In general, the stress of a $SiO_2$ film stacked on a Si substrate by plasma CVD is $-1.0~2.0\times10^9$ dyne/cm² (compression). However, the stress of a $SiO_2$ film becomes $1.0~2.0\times10^9$ dyne/cm² (tension) when it is made on the quartz glass substrate 11 under the same conditions as that stacked on the $SiO_2$ substrate. Since this stress of $SiO_2$ invites a warp of the quartz glass substrate 11 in form of a wafer (hereinafter simply called wafer) during the process, a countermeasure for its alleviation is preferably taken in order to prevent problems caused thereby. Taking it into consideration, the second embodiment will be explained focusing at measures for alleviating the warp of the wafer.

As measures for alleviating the warp of the wafer in the second embodiment, there are a method of increasing the degree of vacuum in the film-making chamber, a method of decreasing the flow rate of TEOS, and a method for increasing the RF power, for example, when making the $SiO_2$ film as the inter-layer insulating film 25 by plasma CVD.

Taking the case where a plasma CVD apparatus manufactured by AMJ is used for stacking the $SiO_2$ film, for example, typical film-making conditions are the pressure of 8.2 Torr, temperature of 400° C., $O_2$ flow rate of 600 sccm, TEOS flow rate of 800 sccm, RF power of 700W, and spacing of 250. However, when the $SiO_2$ film as the inter-layer insulating film 25 is formed on the quartz glass substrate 11 by plasma CVD, if any one is employed among setting the pressure of the film-making chamber not higher than 6.8 Torr, setting the RF power not lower than 800W, or setting the $O_2$/TEOS ratio not less than 1, the stress of the inter-layer insulating film 25 can be alleviated, and the warp of the wafer can be prevented effectively.

In the other respects, the second embodiment of the invention is the same as the first embodiment, and explanation of the common matters is omitted.

According to the second embodiment, the warp of the wafer can be significantly alleviated, in addition to ensuring the same advantages as those of the first embodiment. Therefore, it additionally has the advantage that the liquid crystal display device can be manufactured without problems caused by the warp of the wafer.

Next explained is an example of the third embodiment of the invention. The third embodiment is explained focusing at a countermeasure for alleviating the warp of the wafer, which is different from the measures of the second embodiment.

Figure 6:
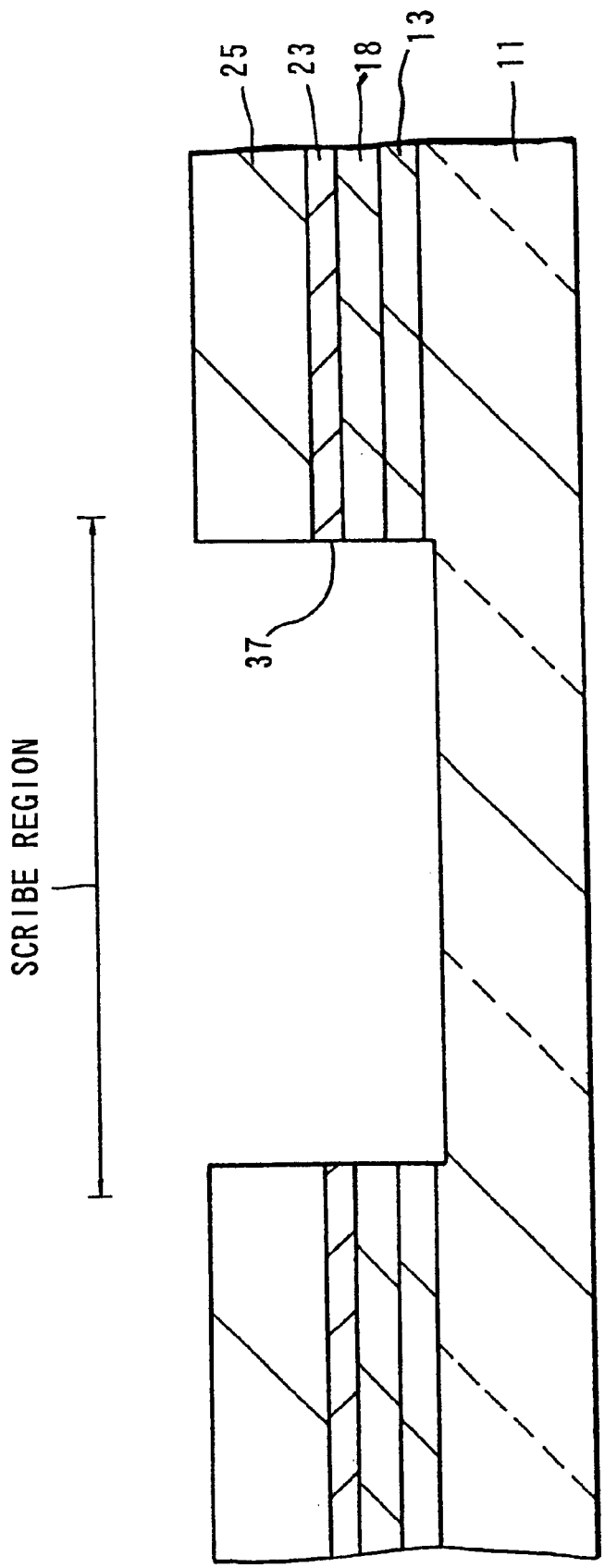
FIG. 6 is a cross-sectional view for explaining the third embodiment of the invention.
Figure 7:
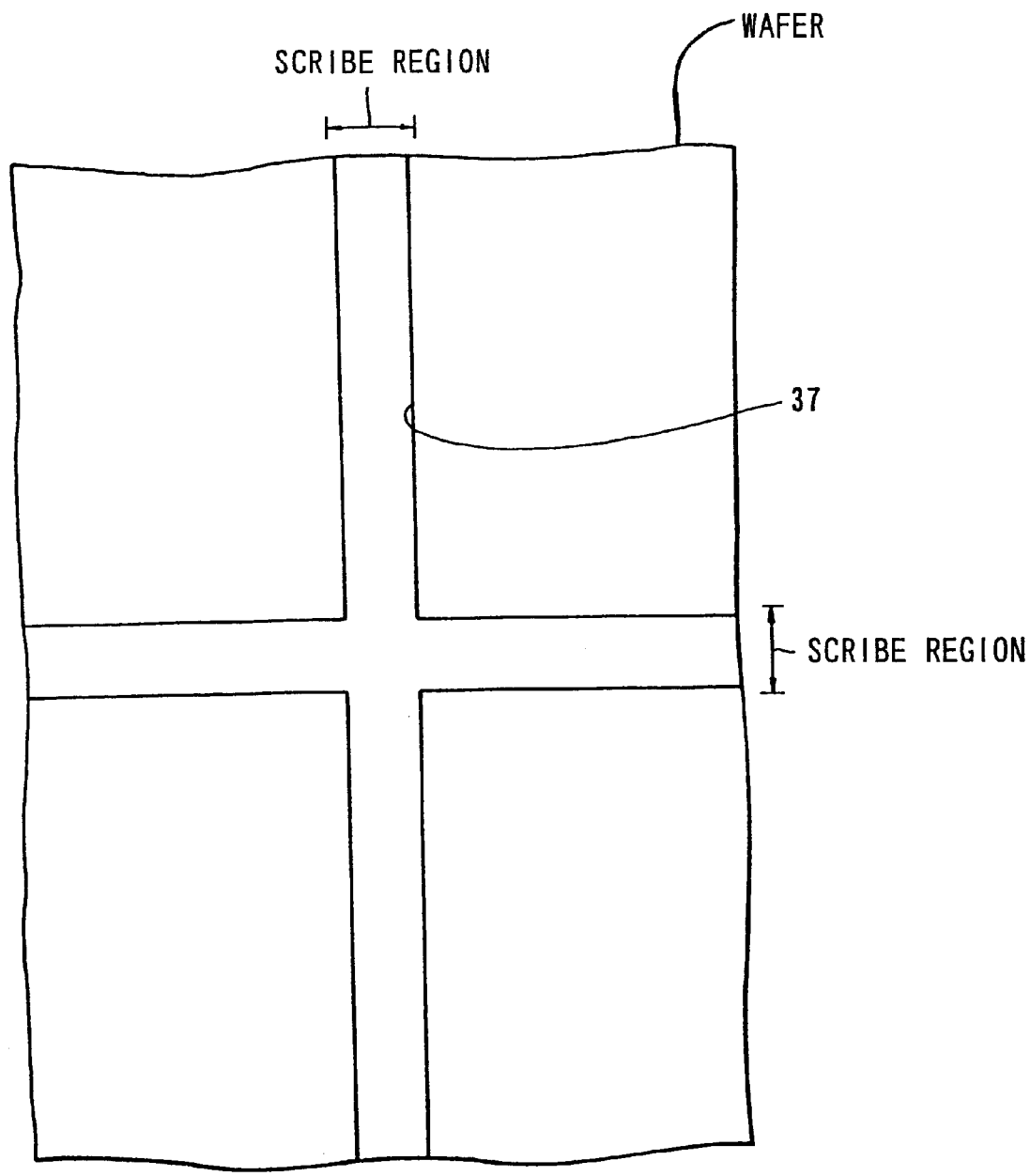
FIG. 7 is a plan view for explaining the third embodiment of the invention.

In the third embodiment, after progressing the process similarly to the first embodiment until finishing the polishing step of the inter-layer insulating film 25, as the countermeasure for alleviating the warp of the wafer, the configuration shown in FIGS. 6 and 7 is made in which a groove 37 is formed in the scribe region of the quartz glass substrate 11 to reach the quartz substrate 11 so that the inter-layer insulating films 13, 18, 23 and 25 are separated into every part for each chip. Width of this groove is about 200 µm, for example. This groove 37 may be made of collectively etching the inter-layer insulating films 13, 18, 23 and 25 after polishing the inter-layer insulting film 25. However, from the viewpoint of simplifying the process, it is advantageous to make it in two separate steps, utilizing the etching for making the contact holes 19, 20 and the etching for making the contact hole 26. More specifically, after the inter-layer insulating film 18 is formed, the inter-layer insulating films 13 and 18 are removed by etching from the scribe region simultaneously with the etching for making the contact holes 19, 20. Then, after the process is progressed to the step of making and polishing the inter-layer insulating film 25, the inter-layer insulating films 23, 25 are removed by etching from the scribe portion simultaneously with the etching for making the contact hole 26. As a result, the groove 37 can be made. For these etching steps, dry etching such as reactive ion etching (RIE), wet etching, or their combination, may be used.

After the groove 37 is made as explained above, the steps of and after making the electrically-conductive light-shading layers 27, 28 follow in the same manner as the first embodiment, and the intended liquid crystal display device is completed.

In the other respects, the third embodiment is the same as the first embodiment, and explanation of the common matters is omitted.

According to the third embodiment, in addition to ensuring the same advantages as those of the first embodiment, the warp of the wafer can be significantly alleviated by dividing the entire stack of the inter-layer insulating films 13, 18, 23 and 25 including the inter-layer insulating film 25 made of $SiO_2$ made by plasma CVD and having a large stress into every part for each chip. Therefore, it has the advantage that the liquid crystal display device can be manufactured without problems caused by the warp of the wafer.

Figure 8:
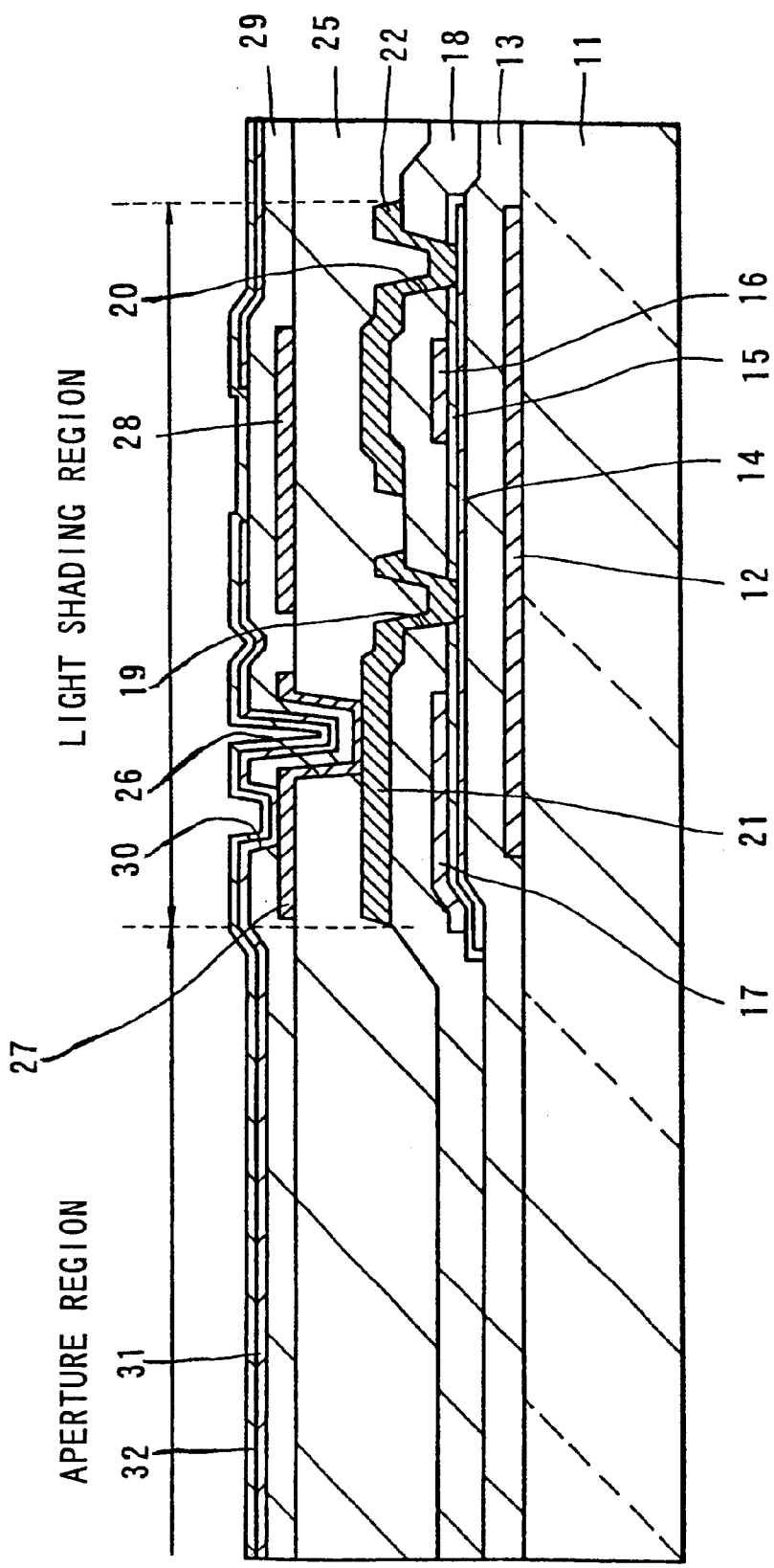
FIG. 8 is a cross-sectional view showing a TFT substrate of a liquid crystal display device according to the fourth embodiment of the invention.

Next explained is a liquid crystal display device according to the fourth embodiment of the invention. FIG. 8 shows an example of this liquid crystal display device.

As shown in FIG. 8, in this liquid crystal display device, only the inter-layer insulating film 25 made of $SiO_2$ film made by plasma CVD is formed as the insulating layer between the layer of the lead-out electrode 21 and the signal wiring 22 and the layer of electrically-conductive light-shading layers 27 and 28. That is, the inter-layer insulating film 18 and the SiN film 24 used in the liquid crystal display device according to the first embodiment are omitted here.

In the other respects, the fourth embodiment is the same as the first embodiment, and explanation of common matters is omitted.

The fourth embodiment also ensures the same advantages as those of the first embodiment.

Having described specific preferred embodiments of the present invention with reference to the accompanying drawings, it is to be understood that the inventions is not limited to those precise embodiments, and that various changes and modifications may be effected therein by one skilled in the art without departing from the scope or the spirit of the invention as defined in the appended claims.

That is, numerical values, structures, configurations, materials, processes, etc. introduced in the above-explained embodiments are not but examples. Any other appropriate numerical values, structures, configurations, materials, processes, etc. can be used, if necessary.

For example, the above-explained embodiments includes the light-shading layer 12 also below the polycrystalline SiTFT. However, this light shading layer 12 is intended to prevent entry of light from below the polycrystalline SiTFT, it may be omitted where appropriate.

In addition, although the above-explained embodiments connects the pixel electrode 31 to the lead-out electrode 21 via the electrically-conductive light-shading layer 27, as long as their good contact is ensured, the pixel electrode 31 may be connected directly to the lead-out electrode 21 without making the electrically-conductive light-shading layer 27.

Furthermore, this invention is basically applicable to any types of liquid crystal display device, which include a thin film transistor provided on a substrate for driving the pixel electrode, and includes an electrically-conductive light-shading layer in the level above the thin film transistor and below the pixel electrode.

As described above, according to the invention, by making an electrically-conductive light-shading layer on a previously smoothed layer, it is possible to improve the light shading property of the electrically-conductive light-shading layer and prevent the image quality caused by a light leak current.

What is claimed is:

1. A liquid crystal display device having a thin-film transistor for driving a pixel electrode on a substrate and an electrically-conductive light-shading layer lying in a level above the thin film transistor and below the pixel electrode, comprising:

said electrically-conductive light-shading layer being formed on a smoothed layer;

wherein a top surface of said smoothed layer is smoothed to a residual level difference not larger than 0.5 µm excluding a contact portion within a display region.

2. The liquid crystal display device according to claim 1 wherein the top surface of the smoothed layer is smoothed by chemical-mechanical polishing.

3. The liquid crystal display device according to claim 1 wherein said smoothed layer is an insulating layer containing $SiO_2$ as its major component.

4. The liquid crystal display device according to claim 3 wherein said insulating layer is made by plasma CVD.

5. The liquid crystal display device according to claim 1 wherein said electrically-conductive light-shading layer is a thin film having a thickness not thinner than 50 nm and not thicker than 500 nm.

6. The liquid crystal display device according to claim 1 wherein said electrically-conductive light-shading layer has a transmittance not larger than 10% for light having a wavelength not shorter than 400 nm and not longer than 500 nm.

7. The liquid crystal display according to claim 1 wherein said electrically-conductive light shading layer is a thin film having a sheet resistance not higher than 100 Ω/□.

8. The liquid crystal display device according to claim 1 wherein said electrically-conductive light-shading layer is divided in a pixel portion into a part connected to said pixel electrode and a part connected to a common potential.

9. The liquid crystal display device according to claim 1 wherein said electrically-conductive light-shading layer makes multiple layers with at least one other light-shading layer against incident light coming from above and functions to shade the light all over the region except a pixel aperture region.

10. The liquid crystal display device according to claim 1 wherein said thin film transistor is made of polycrystalline silicon.

11. A liquid crystal display device having a first light-shading layer formed on a substrate, a thin film transistor for driving a pixel electrode formed on said first light-shading layer, and a second light-shading layer formed in a level above said thin-film transistor and below said pixel electrode, comprising:

said second light-shading layer being formed on a smoothed layer;

wherein a top surface of said smoothed layer is smoothed to a residual level difference not larger than 0.5 µm excluding a contact portion within a display region.

12. A method for manufacturing a liquid crystal display device having a thin-film transistor for driving a pixel electrode on a substrate and an electrically-conductive light-shading layer lying in a level above the thin film transistor and below the pixel electrode, characterized in:

said electrically-conductive light-shading layer being formed on a smoothed layer;

wherein a top surface of said smoothed layer is smoothed to a residual level difference not larger than 0.5 µm excluding a contact portion within a display region.

13. The method for manufacturing a liquid crystal display device according to claim 1 wherein said smoothed layer is smoothed by chemical-mechanical polishing.

14. A method for manufacturing a liquid crystal display device having a first light-shading layer formed on a substrate, a thin film transistor for driving a pixel electrode formed on said first light-shading layer, and a second light-shading layer formed in a level above said thin-film transistor and below said pixel electrode, characterized in:

said second light-shading layer being formed on a smoothed layer;

wherein a top surface of said smoothed layer is smoothed to a residual level difference not larger than 0.5 µm excluding a contact portion within a display region.

* * * * *

UNITED STATES PATENT AND TRADEMARK OFFICE
CERTIFICATE OF CORRECTION

PATENT NO.    : 6,335,772 B1
DATED         : January 1, 2002
INVENTOR(S)   : Sato et al.

It is certified that error appears in the above-identified patent and that said Letters Patent is hereby corrected as shown below:

<u>Column 12,</u>
Line 7, replace "claim 1" with -- claim 12 --.

Signed and Sealed this

Fourteenth Day of May, 2002

*Attest:*

JAMES E. ROGAN
*Attesting Officer*      *Director of the United States Patent and Trademark Office*